United States Patent

Yuji et al.

[11] Patent Number: 5,619,860
[45] Date of Patent: Apr. 15, 1997

[54] CONTROLLING APPARATUS FOR AN AIR CONDITIONER

[75] Inventors: Tsuchiyama Yuji; Shimizu Masayuki, both of Gunma-ken, Japan

[73] Assignee: Sanyo Electric Co., Ltd., Osaka-fu, Japan

[21] Appl. No.: 253,110

[22] Filed: Jun. 2, 1994

[51] Int. Cl.[6] ................................................ G05D 23/00
[52] U.S. Cl. ........................... 62/163; 62/202; 236/68 B
[58] Field of Search ............................ 62/158, 161, 163, 62/202, 229, 226, 227, 228.1, 180; 165/26; 236/51, 68 R, 68 B

[56] References Cited

U.S. PATENT DOCUMENTS

| | | | |
|---|---|---|---|
| 3,948,438 | 4/1976 | Vlasak | 62/202 X |
| 4,114,681 | 9/1978 | Denny | 62/202 X |
| 4,948,045 | 8/1990 | Romano | 236/51 |
| 5,299,430 | 4/1994 | Tsuchiyama | 62/180 |

Primary Examiner—Harry B. Tanner
Attorney, Agent, or Firm—Darby & Darby

[57] ABSTRACT

A controlling apparatus for an air conditioner includes a relay serving to control the feeding of electricity to a compressor, a semiconductor element including a controlling terminal to control the feeding of electricity to a magnetizing coil of said relay, a temperature controlling mechanism for changing the connected state between contact points thereof to another one depending on a preset temperature value and a detected temperature value, a heating section adapted to generate heat by feeding a small quantity of electric current while performing temperature compensation in association with the changing operation with the contact points in the temperature controlling mechanism connected to each other, electricity transmitting paths each serving to feed the electricity fed from the contact points in the temperature controlling mechanism to the controlling terminal of each of the semiconductor elements therethrough, and a restricting circuit for allowing the semiconductor elements disposed in the electricity transmitting paths to restrict the feeding of electricity to the magnetizing coil in response to the feeding of a small quantity of electricity.

6 Claims, 5 Drawing Sheets

CONTROLLING APPARATUS FOR AN AIR CONDITIONER

BACKGROUND OF THE INVENTION

1. Field of the Invention

The present invention relates generally to a controlling apparatus for an air conditioner. More particularly, the present invention relates to a controlling apparatus for an air conditioner including the improved structure of an interface circuit adapted to exhibit excellent properties when a remote controller is attached to a main body of the air conditioner. Further, the present invention relates to electric circuit for the controlling apparatus which assures that each switch disposed separately from the main body of the air conditioner can effectively be actuated.

2. Background Art

A typical conventional controlling apparatus of the foregoing type employable for an air conditioner is disclosed in an official gazette of Japanese Patent Laid-Open Publication No. 3-233247. According to the prior invention, the controlling apparatus is constructed such that it is mounted on a main body of the air conditioner and an operation to be performed by the air conditioner is controlled by actuating a selection switch disposed on the controlling apparatus in response to an operation command signal outputted from the controlling apparatus for the air conditioner in association with a compressor and a blower.

With the conventional controlling apparatus for an air conditioner constructed in the above-described manner, because of the fact that the selection switch is disposed on the main body of the air conditioner, when an operation of the air conditioner is started, it is necessary that a user walks to the main body of the air conditioner with his own feet.

In the case that the selection switch is separated from the main body of the air conditioner and then disposed at the position where each user can conveniently actuate the selection switch, it is necessary that components such as relays, transformers or the like are additionally arranged for the air conditioner to improve the structure of each electric circuit. Consequently, there arises a problem that manhours required in association with electrical works conducted for installing the air conditioner increase.

In addition, in the case that an operation to be performed by the air conditioner is controlled by utilizing signals outputted from the existent temperature controlling unit, when a plurality of semiconductor elements for controlling the compressor and others incorrectly match with signals outputted from the temperature controlling unit, there arises another problem that the air conditioner is erroneously operated.

SUMMARY OF THE INVENTION

The present invention has been made in consideration of the aforementioned background.

An object of the present invention provides a controlling apparatus for an air conditioner which assures that correct matching can be maintained between semiconductor element in the controlling apparatus and a series of signals outputted from a temperature controlling unit when the existing temperature controlling unit is employed for the controlling apparatus as it is.

Another object of the present invention is to provide a controlling apparatus for an air conditioner which assures that a restricting circuit arranged in the controlling apparatus can prevent the air conditioner from being erroneously operated due to the presence of an electric current flowing through the restricting circuit.

According to a first aspect of the present invention, there is provided a controlling apparatus for an air conditioner including a refrigerating cycle which is constructed by a compressor, a heat exchanger on a heat source side, an expansion device, and a heat exchanger on a utilization side, wherein the controlling apparatus comprises a relay serving to feed electricity to the compressor therethrough in response to the feeding of electricity to a magnetizing coil thereof, a semiconductor element including a controlling terminal so as to control the feeding of electricity to the magnetizing coil of the relay therewith in response to a signal applied to the controlling terminal, a thermostat for changing the connected state between contact pieces thereof to another one depending on a preset temperature value and a detected temperature value, a heating section adapted to generate heat by receiving a small quantity of electricity while the contact pieces of the thermostat are connected to each other, the heating section serving to provide a differential every time when the connected state of the thermostat is changed to another one, and at least one electricity transmitting path serving to feed the electricity fed from the contact pieces of the thermostat to the controlling terminal of the semiconductor element in the form of a signal to be applied to the latter, whereby the semiconductor element feeds electricity to the magnetizing coil in response to the feeding of the small quantity of electricity while preventing an operation of the compressor from being started.

In addition, according to a second aspect of the present invention, there is provided a controlling apparatus for an air conditioner including a refrigerating cycle which is constituted by a compressor, a four-way valve, a heat exchanger on a heat source side, an expansion device, and a heat exchanger on a utilization side, the air conditioner performing a cooling operation and a heating operation with the aid of the heat exchanger on the utilization side while the present operative state of the four-way valve is changed to another one and further including an electric heater serving for the purpose of auxiliary heating, wherein the controlling apparatus comprises a relay for the compressor serving to feed electricity to the compressor in response to the feeding of electricity to a magnetizing coil thereof, a relay for the electric heater serving to feed electricity to the electric heater in response to the feeding of electricity to a magnetizing coil thereof, a semiconductor element for controlling the compressor, said semiconductor element controlling the feeding of electricity to the magnetizing coil of the relay for the compressor in response to a signal applied to a controlling terminal thereof, a semiconductor element for controlling the electric heater, said semiconductor element controlling the feeding of electricity to the magnetizing coil of the relay for the electric heater in response to a signal applied to a controlling terminal thereof, a thermostat for controlling the compressor, said thermostat serving to change the connected state between contact points thereof to another one depending on a first preset temperature value and a detected temperature value, a thermostat for controlling the electric motor, said thermostat serving to change the connected state between contact points thereof to another one depending on a second preset temperature value and a detected temperature value, a heating section adapted to generate heat by receiving a small quantity of electricity while the contact points of each of the thermostats are connected to each other, said heating section serving to provide a differential every time when the connected state of the contact points of each thermostat is changed to another one, electricity transmitting paths each serving to feed the electricity fed from the contact points of the thermostat to the controlling terminal of each of the semiconductor elements in the form of a signal to be applied to the controlling terminal of each of the semiconductor elements, and restricting circuits disposed in the electricity transmitting paths, each of the restricting circuits restricting the feeding of the small quantity of electricity to each of the semiconductor elements, whereby each of the semiconductor elements feeds electricity to the magnetizing coils in response to the feeding of the small quantity of electricity while preventing an operation of the compressor and/or feeding of electricity to the electric heater from being started.

Additionally, according to third and fourth aspects of the present invention, it should be noted that properties of a Zener diode are employed for each restricting circuit.

Furthermore, according to a fifth aspect of the present invention, there is provided a controlling apparatus for an air conditioner including a refrigerating cycle which is constituted by a compressor, a heat exchanger on a heat source side, an expansion device, and a heat exchanger on a utilization side, the air conditioner further including an electric motor for blowing an air air-conditioned in the heat exchanger on the utilization side to a regulating unit, wherein the controlling apparatus comprises a first relay for controlling the feeding of electricity to the compressor, a second relay for controlling the feeding of electricity to the electric motor, a temperature controlling circuit for controlling at least an operation of each of the first and second relays depending on a detected temperature value and a preset temperature value, a switch for forcibly stopping at least the feeding of electricity to the compressor and the electric motor irrespective of an operation of the temperature controlling circuit, and an electric circuit for making it possible to feed electricity to the electric motor irrespective of the actuation of the switch, causing the temperature controlling circuit to be effectively controlled relative to the electric motor.

With the controlling apparatus for an air conditioner constructed in the above-described manner, correct matching can be maintained between a plurality of semiconductor elements in the controlling apparatus and a series of signals outputted from a temperature controlling circuit at all times while preventing the controlling apparatus from being erroneously operated, even in the case that the existent temperature controlling unit includes a heat generating section for the purpose of temperature compensation.

Other objects, features and advantages of the present invention will become apparent from reading of the following description which has been made in conjunction with the accompanying drawings.

BRIEF DESCRIPTION OF THE DRAWINGS

The present invention is illustrated in the following drawings in which.

DETAILED DESCRIPTION OF THE PREFERRED EMBODIMENTS

The present invention will now be described in detail hereinafter with reference to the accompanying drawings which illustrate a preferred embodiment thereof.

Figure 1:
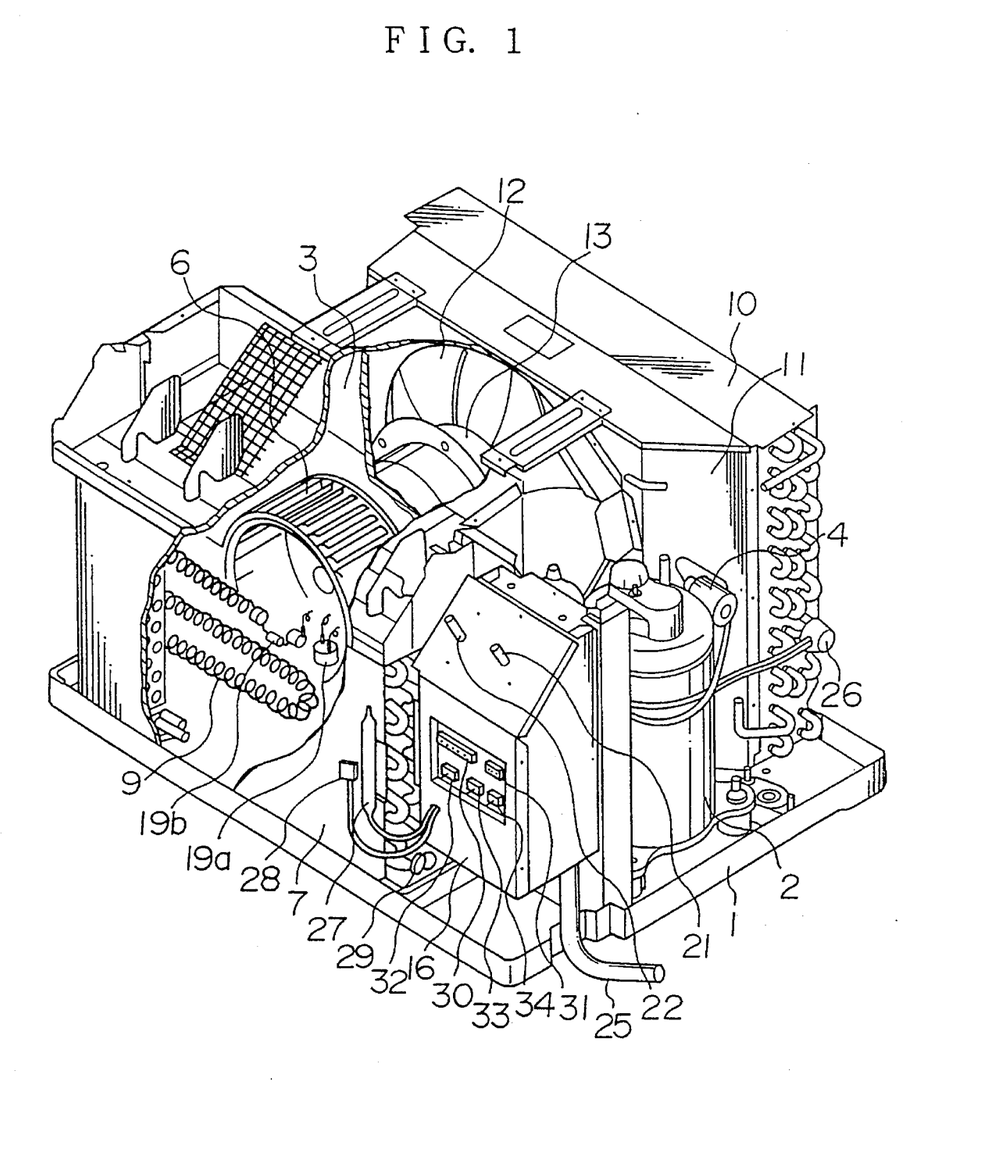
FIG. 1 is a partially exploded perspective view of an air conditioner including controlling apparatus constructed according to an embodiment of the present invention.

FIG. 1 is a perspective view of a partially exploded perspective view of an air conditioner including a controlling apparatus constructed according to the embodiment of the present invention wherein the air conditioner is shown with a casing removed therefrom. In the drawing, reference numeral 1 designates a bottom plate on which the air conditioner is mounted. The bottom plate 1 is made of a metallic plate by way of the steps of bending and others. Reference numeral 2 designates a compressor. The compressor 2 constitutes a refrigerating cycle in cooperation with a heat exchanger 7 on an internal side (i.e., a heat exchanger on a utilization side), a heat exchanger 10 on an external side (i.e., a heat exchanger on a heat source side), a four-way valve 4 and an expansion device.

In the case that the heat exchanger 7 on the internal side serves as an evaporator and the heat exchanger 10 on the external side serves as a condenser, when an operation of the compressor 2, a blower 6 on the internal side and a blower 12 on the external side is started, a cooling operation is performed for a room to be air-conditioned. On the contrary, in the case that the heat exchanger 7 on the internal side serves as a condenser and the heat exchanger 10 on the external side serves as an evaporator by changing the four-way valve 4 to another location, a heating operation can be performed for the room to be air-conditioned.

Reference numeral 3 designates a partition wall for dividing the inner space of the air conditioner into two sections, one of them being a space section on the external side and the other one being a space section on the internal side. The compressor 2, the blower 12 on the external side (i.e., a propeller fan), the heat exchanger 10 on the external side, a fan casing 11 and other associated components are accommodated in the space section on the external side. Reference numeral 13 designates an electric motor mounted in the space section on the external side. As the electric motor 13 is rotationally driven, environmental air is introduced into the space section on the internal side via a rear surface grill and then flows along both the side surfaces of the heat exchanger 10 on the external side, and thereafter, it is blown to the heat exchanger 10 on the external side via the rear side of the fan casing 11.

Reference numeral 26 designates a frosting detector which is disposed adjacent to the heat exchanger 10 on the internal side. The frosting detector 26 determines whether or not a phenomenon of frosting appears on an electrical circuit to be described later by detecting the temperature of the heat exchanger 10 on the external side.

The blower 6 on the internal side (i.e., a scirocco fan), the heat exchanger 7 on the internal side and an electric heater 9 and other associated components are accommodated in the space section on the internal side. The blower 6 on the internal side and the blower 12 on the external side are fixedly mounted on opposite output shafts of the electric motor 13. Thus, as the electric motor 13 is rotationally driven, both the blowers 6 and 12 are simultaneously rotated by the electric motor 13, whereby air introduced into the room to be air-conditioned via a suction grill on the internal side is cooled or heated by the heat exchanger 7 on the internal side, and subsequently, after it is heated by the electric heater 9, it is blown to the room to be air-conditioned via a blowing grill on the internal side. It should be noted that the suction grill and the blowing grill are formed through a cabinet molded of a synthetic resin and secured to the bottom plate 1.

Reference numeral 19a designates a temperature switch (serving as a protective switch) of which contacts pieces are parted away from each other when the temperature of the electric heater 9 detected thereby is elevated in excess of a predetermined protective temperature, and reference numeral 19b designates an electric current fuse adapted to be molten when an intensity of electric current flowing through the electric heater 9 is increased in excess of a predetermined electric current value. The temperature switch 19a and the electric current fuse 19b are electrically connected to the electric heater 9 in series.

Reference numeral 16 designates an electrical instrument box. A controlling unit inclusive of a base board for electrical instruments is accommodated in the electrical instrument box 16. Reference numerals 21 and 22 designate switches, respectively, each of which serves to feed a signal to the controlling unit. The switch 21 is designed in the form of a selection switch for sequentially changing the present mode of air conditioning to one of other ones (a COOL (strong) mode for a cooling operation, a COOL (weak) mode for the same, a FAN mode for performing an air blowing operation for the room to be air-conditioned, an OFF mode for stopping the operation of the air conditioner, a HEAT (strong) mode for a heating operation, and a HEAT (weak) mode), and the switch 22 is actuated in association with a thermostat for detecting the room temperature. Reference numeral 25 designates a power source cord for feeding electricity into the electrical instrument box 16.

The foregoing thermostat for detecting the room temperature is disposed to detect the temperature of environmental air introduced into the room to be air-conditioned by rotating the fan 6 arranged on the primary side of the heat exchanger 7 on the internal side, i.e., the temperature of the roll to be air-conditioned.

Reference numeral 28 designates a temperature detector. The temperature detector 28 is disposed at the position located in the vicinity of the thermostat 27. A preset temperature of the temperature detector 28 is kept unchangeable, and contact pieces of the temperature detector 28 are closed when the room temperature is lowered in excess of a preset temperature (e.g., −3° C.).

Reference numeral 29 designates a thermostat for preventing a phenomenon of frosting from appearing. The thermostat 29 serves to detect the temperature of the heat exchanger 7 on the internal side. In practice, the appearance of the phenomenon of frosting is detected when the temperature of the heat exchanger 7 on the internal side is lowered in excess of a preset temperature of −7° C.

Reference numeral 30 designates a connector for making connection to a remote controller (not shown), and reference numeral 31 designates a connector for connecting cables extending from a central controlling unit to the electrical instrument box 16.

Reference numeral 32 designates a fan cycle switch. When this switch 32 is changed to the FC side, ON/OFF of the compressor 2 can be associated with ON/OFF of the electric motor 13. Incidentally, while the switch 32 is changed to the CONT side, the electric motor 13 is continuously rotationally driven regardless of ON/OFF of the compressor 2.

Reference numeral 33 designates a change switch. While this switch 33 is changed to the a side, an operation of the air conditioner is controlled in response to an operation command signal (generated on receipt of a DC voltage) from the remote controller connected to the connector 30. On the contrary, while the switch 33 is changed to the b side, the operation of the air conditioner is controlled in response to an operation command signal (generated on receipt of a DC voltage) outputted from the selection switch 21.

Reference numeral 34 designates a power source switch for the air conditioner.

FIG. 2 to FIG. 5 show by way of electric circuit diagrams the structure of an electric circuit employable for controlling the air conditioner shown in FIG. 1.

Figure 2:
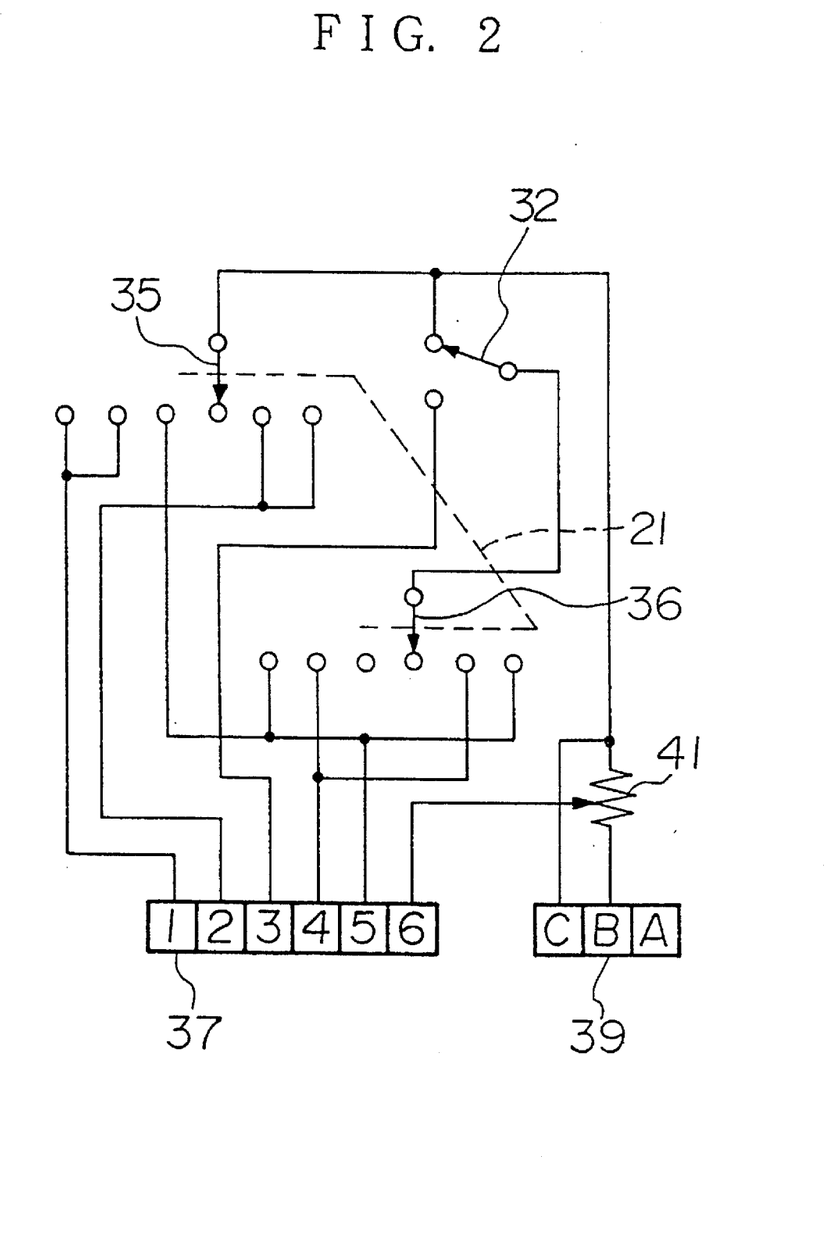
FIG. 2 is an electric circuit diagram which shows the structure of a part of an electric circuit employable for the air conditioner shown in FIG. 1.

FIG. 2 is an electric circuit diagram which shows the structure of a part of the electric circuit associated with the selection switch 21, and the foregoing part of the electric circuit includes change contact pieces 35 and 36 each adapted to be changed on actuation of the selection switch 21 and a fan cycle switch 32. Terminals associated with the selection switch 21 represent six operation modes as designated from the left-hand side, i.e., a COOL (strong) mode, a COOL (weak) mode, a FAN mode, an operation stop mode, a HEAT (weak) mode, and a HEAT (strong) mode.

Figure 3:
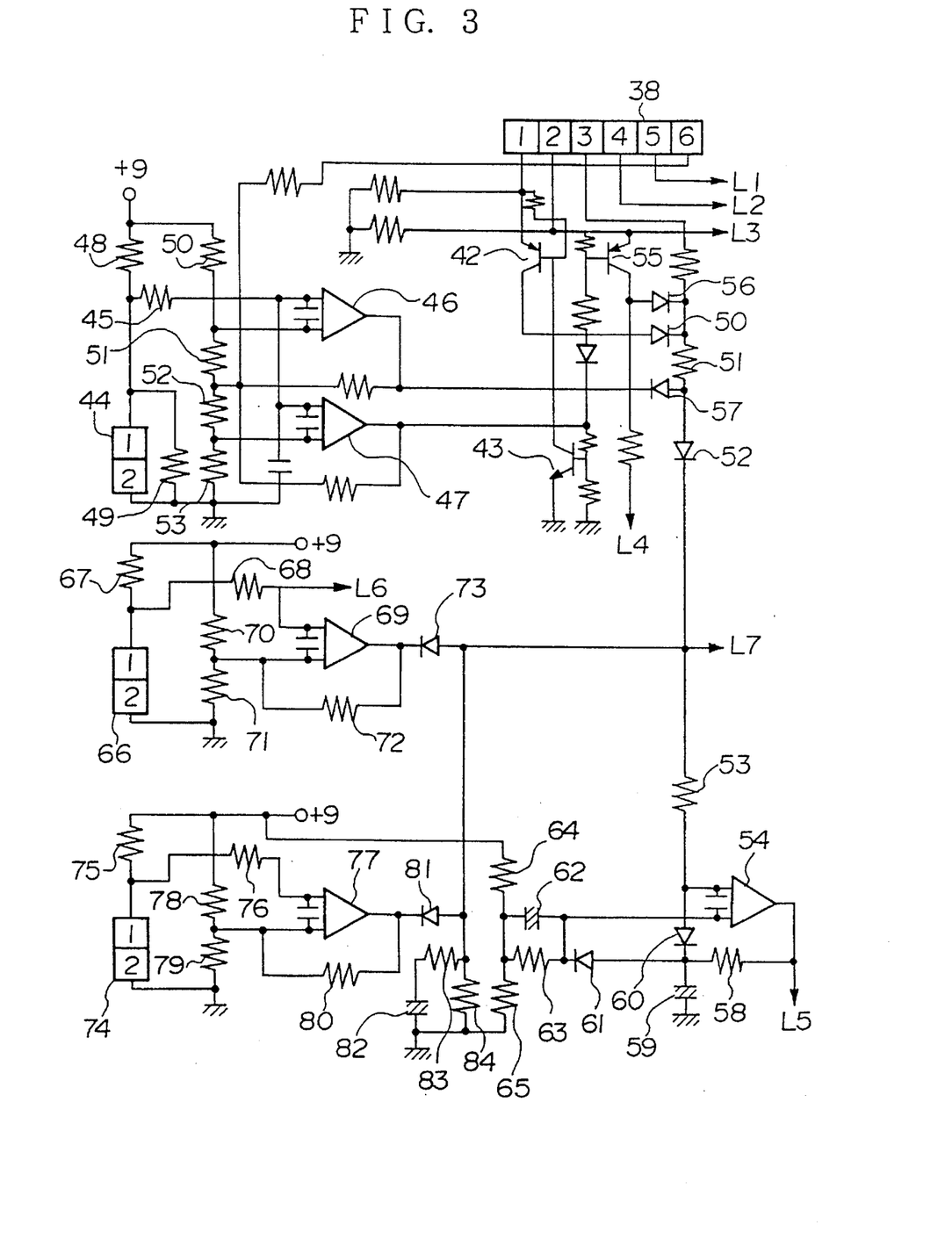
FIG. 3 is an electric circuit diagram which shows the structure of other part of the electric circuit employable for the air conditioner shown in FIG. 1.

The foregoing part of the electric circuit is electrically connected to a connector 38 shown in FIG. 3 via a connector 37 in such a manner that terminal numbers on the connector 37 are coincident with those on the connector 38. Similarly, a connector 39 is electrically connected to a connector 40 shown in FIG. 4 in such a manner that terminal numbers on the connector 39 are coincident with those on a connector 40. It should be noted that the connector 39 is electrically connected to the connector 40 when it is required that the selection switch 21 is effectively utilized for the foregoing part of the electric circuit shown in FIG. 2.

In FIG. 2, reference numeral 41 designates a variable resistor. An operation of the compressor is controlled depending on a magnitude of the voltage which has been preset by the variable resistor 41.

Referring to FIG. 3, while the selection switch 21 is changed to assume a COOL position, a voltage of 9 V appears on a terminal NO. 1 on the connector 38, causing electricity to be fed to a switching transistor 42. An ON/OFF operation of the transistor 42 is controlled by a transistor 43.

The electric circuit shown in FIG. 3 includes a connector 44 of which terminal NO. 1 and terminal NO. 2 have the thermostat 22 (i.e., a thermistor having negative properties) connected thereto at the position located therebetween, and a divisional voltage divided due to variation of a resistor value of the thermistor is fed to one of input terminals on each comparators 46 and 47 via a resistor 45. Reference numerals 48 and 49 designate bias resistors, respectively, each of which serves to bias the thermistor.

Reference numerals 50, 51, 52 and 53 designate resistors, respectively, each of which serves to divide a certain voltage into divisional voltages. Each divisional voltage obtained by dividing a voltage of +9 V is fed to the other terminal of each of the camporee 46 and 47. The voltage applied to the latter terminal of the comparator 46 is preset such that the voltage applied to the former terminal of the comparator 47 is higher than the voltage applied to the latter terminal of the same.

For this reason, when the temperature detected by the thermistor connected to the connector 44 is lowered, causing the voltage applied to the former terminal of the comparator 47 to be higher than the voltage applied to the other terminal of the same, an output from the comparator 47 is held at a L level. In addition, when the temperature detected by the thermistor is lowered, causing the voltage applied to the former terminal of the comparator 46 to be higher than the voltage fed to the other terminal of the same, an output from the comparator 46 is likewise held at a L level.

If an output from the comparator 47 is held at a H level (which represents that the temperature detected by the thermistor is kept high) when electricity is fed from a terminal NO. 1 on the connector 38 (while maintaining a COOL mode), both the transistors 43 and 42 are turned on, causing the voltage held at a H level to be applied to one terminal of a comparator 54 via a diode 50, a resistor 51, a diode 52 and a resistor 53.

In addition, if an output from the comparator 47 is held at a L level (which represents that the temperature detected by the thermistor is kept low) while electricity is fed from a terminal NO. 2 on the connector 38 (during a heating operation), a transistor 55 is turned on, causing the voltage held at a H level to be applied to the one terminal of the comparator 54 via a diode 56, the resistor 51, the diode 52 and the resistor 53.

When the temperature detected by the thermistor is lowered, causing an output from the comparator 46 to be held at a L level, a potential appearing between the resistor 51 and the diode 52 via a diode 57 is lowered to reach a L level. Thus, there is no possibility that the voltage to be outputted at a H level fed at a time when the transistor 55 is turned on is fed to the one terminal of the comparator 54.

The comparator 54 constitutes a timer circuit which is composed of a resistor 58, a capacitor 59, diodes 60 and 61, a capacitor 62, resistors 63, 64 and 65 and others. This timer circuit serves to convert an output from the comparator 54 into a voltage having a H level when a certain voltage having a H level is applied to one terminal of the comparator 54, and thereafter, forcibly hold the output from the comparator 54 at a L level for a predetermined period of time after the voltage applied to the one terminal of the comparator 54 is varied to a voltage having a L level. In other words, although the voltage having a H level is applied to the one terminal of the comparator 54 again for the predetermined period of time, the output from the comparator 54 is unchangeably held at a L level until the predetermined period of time elapses. This predetermined period of time is coincident with the time that elapses until the voltage of the capacitor 62 is discharged to assume a voltage having a H level or less, and the foregoing predetermined period of time is preset mainly depending on a capacity of the condenser 62 and a value of the discharging resistor 63.

Incidentally, when the output from the comparator 54 is converted into a voltage having a H level, the compressor 2 starts its operation. In addition, when the transistor 55 is turned on, an electric current is caused to flow through the electric heater 9.

A thermistor 26 having unspecified properties (serving as a frosting detector) for detecting the temperature of the heat exchanger 10 on the external side is electrically connected to terminals NO. 1 and NO. 2 on the connector 66, and when the thermistor 26 is biased by a resistor 67, the voltage corresponding to the temperature of the heat exchanger 10 on the external side is applied to one terminal of a comparator 69 via a resistor 68. When this voltage is increased in excess of the divisional voltage preset by resistors 70 and 71, an output from the comparator 69 is converted into a voltage having a L level, and moreover, a potential appearing between the diode 52 and the resistor 53 is reduced to assume a voltage having a L level, resulting in the operation of the compressor 2 being stopped.

In other words, when the temperature on the heat exchanger 10 on the external side is lowered in excess of the temperature corresponding to the foregoing divisional voltage, an output from the comparator 69 is converted into a voltage having a L level. Incidentally, the resistor 72 is provided in the form of a resistor which serves to determine a differential when the H level of the comparator 69 is changed to the L level of the same, and vice versa. In FIG. 3, reference numeral 73 designates a diode employable for the purpose of restricting.

In addition, the electric circuit shown in FIG. 3 includes a connector 74 of which terminals NO. 1 and NO. 2 are electrically connected to the thermistor 29 having unspecified properties (serving as a thermostat for preventing an occurrence of freezing) for detecting the temperature of the heat exchanger 9 on the internal side, and when the thermistor 29 is biased by a resistor 75, a voltage corresponding to the temperature of the heat exchanger 9 on the internal side is applied to one terminal of a comparator 77 via a resistor 76. When this voltage is increased in excess of the divisional voltage preset by resistors 78 and 79, an output from the comparator 77 is converted into a voltage having a L level, and a potential appearing between the diode 52 and the resistor 53 is reduced to assume a voltage having a L level, resulting in the operation of the compressor 2 being stopped.

Specifically, when the temperature of the heat exchanger 9 on the internal side is lowered in excess of the temperature (e.g., −7° C.) corresponding to the divisional voltage, an output from the comparator 77 is converted into a voltage having a L level. Incidentally, a resistor 80 is provided in the form of a resistor which serves to determine a differential when the H level of the comparator 77 is changed to the L level of the same, and vice versa. Reference numeral 81 designates a diode which serves for the purpose of restricting.

A capacitor 82 and resistors 83 and 84 are components each constituting a delay circuit which serves to mask an output of the L level voltage from the camporee 69 and 77 for a period of time until the potential of the capacitor 82 is lowered therewith while preventing the compressor 2 from being erroneously operated at the time of starting of an operation of the same.

Figure 4:
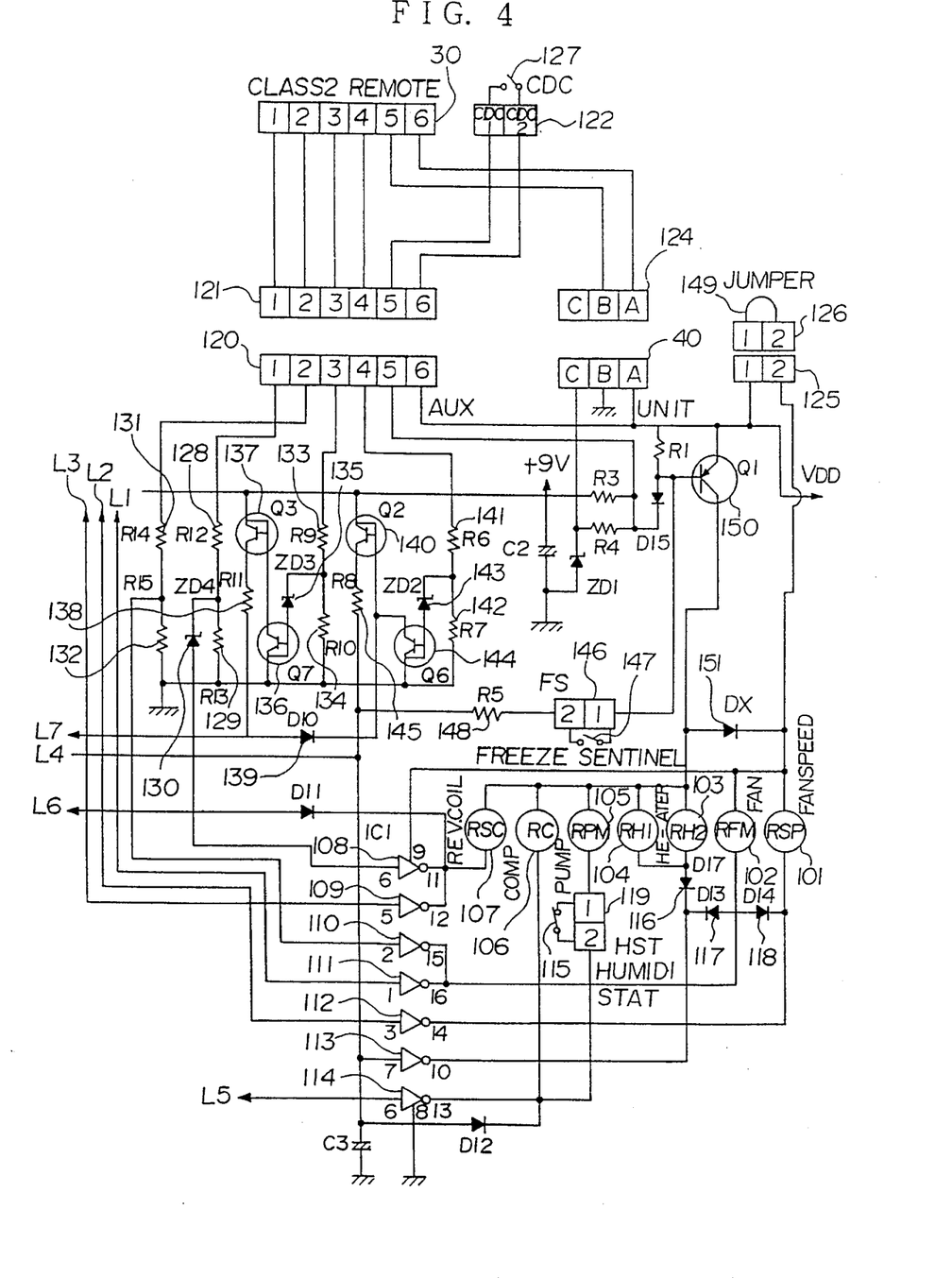
FIG. 4 is an electric circuit diagram which shows the structure of another part of the electric circuit employable for the air conditioner shown in FIG. 1.

The electric circuit shown in FIG. 4 is electrically connected to the electric circuit shown in FIG. 3 via a plurality of lines L1 to L7. In FIG. 4, reference numerals 101 to 107 designate a plurality of auxiliary relays, i.e., an auxiliary relay for changing a speed of the electric motor 13, an auxiliary relay for executing start/stop of the electric motor 13, an auxiliary relay for feeding electricity to the electric heater 9, an auxiliary relay for controlling the operation of a drain pump (not shown), an auxiliary relay for controlling the operation of the compressor 2, and an auxiliary relay for controlling the four-way valve 4.

Reference numerals 108 to 114 designate inverted buffers for driving the aforementioned auxiliary relays, respectively. When a voltage having a H level is applied to the input side of each of the buffers, an output from each buffer is converted into a voltage having a L level, whereby electricity is fed to each of the auxiliary relays 101 to 107.

While the air conditioner is operated while maintaining the COOL (weak) mode or the HEAT (weak) mode, an output from the buffer 112 is converted into a voltage having a L level, causing electricity to be fed to the auxiliary relay 101 for changing the speed of the electric motor 13 to another one. At the same time, electricity is fed to the auxiliary relay 102 for executing start/stop of the fan via a diode 118. Also when electricity is fed to the auxiliary relay 103 for the electric heater 9, electricity is simultaneously fed to the auxiliary relay 102 for executing start/stop of the fan via a diode 117. A diode 116 is used for preventing the air conditioner from being erroneously operated.

Reference numeral 115 designates a humidity detector which is electrically connected to a terminal NO. 1 and a terminal NO. 2 on a connector 119 at the position located therebetween. When a humidity in the room to be air-conditioned is lowered in excess of a predetermined value, contact pieces of the humidity detector 115 are kept closed, enabling a pump for elevating the present level of humidity in the room to be air-conditioned to be operated. An effect for additionally supplying moisture, i.e., water droplets to the room to be air-conditioned can be obtained by spraying water over the heat exchanger 7 on the interior side by driving the foregoing pump.

Reference numerals 120 and 121 designate connectors, respectively. Both the connectors 120 and 121 are electrically connected to each other in such a manner that terminal numbers on the connector 120 are exactly coincident with those on the connector 121. Reference numeral 122 designates a connector which is electrically connected to terminals NO. 5 and NO. 6 of the connector 122. A switch 127 for the central controller is electrically connected to the connector 121. The electric circuit shown in FIG. 5 (i.e., an electric circuit for the remote controller arranged separately from a main body of the air conditioner) is electrically connected to the connector 30. In addition, the connector 30 is electrically connected to a connector 123 shown in FIG. 5 in such a manner that terminal numbers on the connector 30 are exactly coincident with those on the connector 123.

Figure 5:
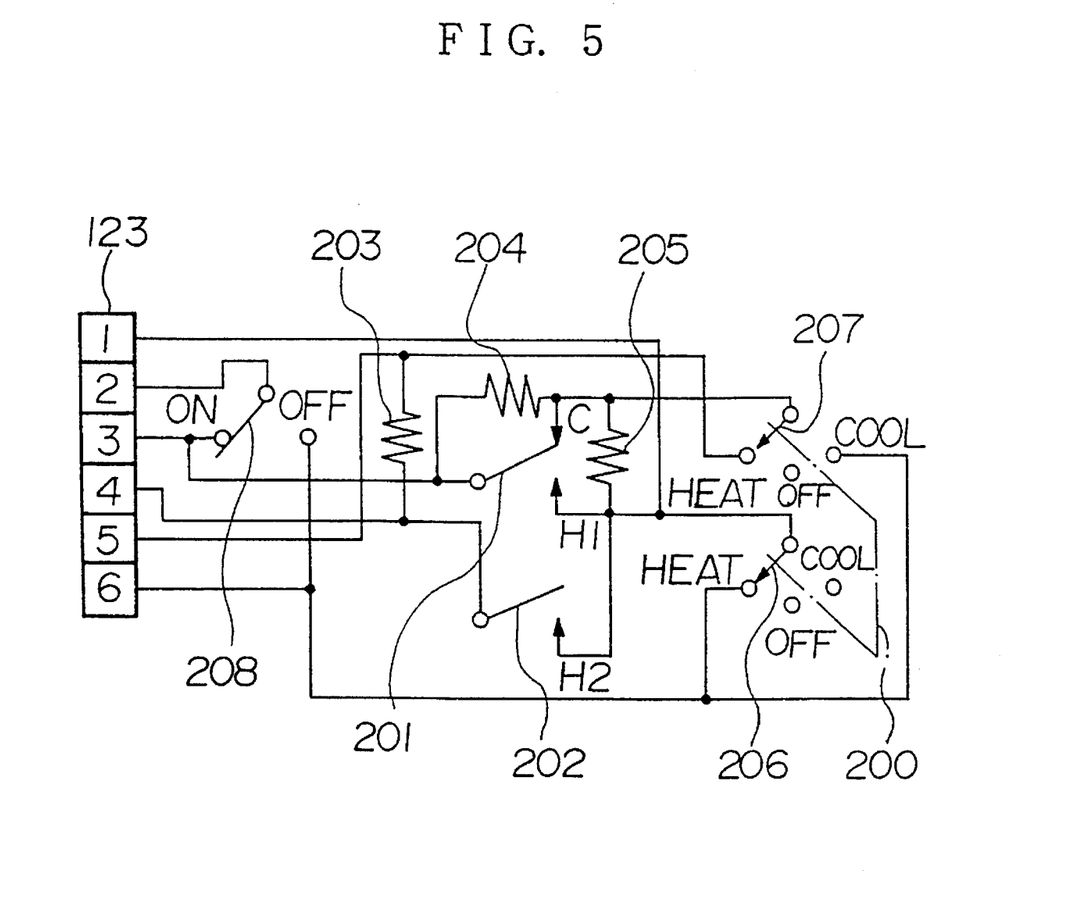
FIG. 5 is an electric circuit diagram which shows the structure of further another part of the electric circuit employable for the air conditioner shown in FIG. 1.

When the connector 123 is electrically connected to the connector 30, a connector 124 is electrically connected in such a manner that terminal numbers on the connector 40 are exactly coincident with those on the connector 124 so as to enable electricity of DC of 24 V to be fed to the electric circuit shown in FIG. 5. In other words, in the case that the remote controller is practically used, the connector 39 is removed from the electric circuit.

Referring to FIG. 5 again, reference numerals 201 and 202 designate working contact pieces for thermostats respectively for controlling the compressor and for controlling the electric heater, wherein the thermostats being arranged in the electric circuit shown in the drawing, respectively. So-called two stage thermostat may be used for such purpose instead of the above. The working contact pieces 201 and 202 are changed to the C side or the H1 side as well as to the open side or the H2 side depending on a magnitude of each preset temperature and a magnitude of each detected temperature. The working contact piece 202 is designed to be actuated at a temperature lower than that of the working contact piece 201 by a predetermined quantity. Reference numerals 203, 204 and 205 designate electric heaters (heating sections), respectively. When the working contact pieces 201 and 202 are changed to the H1 side and the H2 side, electricity is fed to the electric heaters, causing the working contact pieces 201 and 202 to be actuated to provide a differential therebetween.

Reference numeral 206 designates a change switch adapted to be actuated so as to selectively determine one of operation modes (HEAT, OFF, COOL) employable for the air conditioner at present. Reference numerals 206 and 207 designate change contact pieces adapted to be actuated in operative association with each other corresponding to the present operation mode employed for the air conditioner, respectively. When the change contact pieces 206 and 207 are changed to the HEAT (heating mode) side, electricity is fed to the working contact pieces 201 and 202 via the change contact piece 206. If the detected temperature is lower than a preset one, this means that the working contact piece 201 is changed to the H1 side. Thus, a DC voltage signal of +24 V (i.e., a signal representing that the compressor 2 is turned on) obtained from a terminal NO. 6 on the connector 123 is outputted to a terminal NO. 3 on the same. In addition, when the detected temperature is reduced to be lower than a predetermined one, this means that the working contact piece 202 is changed to the H2 side. Thus, a DC voltage signal of +24 V (i.e., a signal representing that the electric heater 9 serving as an auxiliary heat source is turned on) is outputted from a terminal NO. 4 on the connector 123 in the same manner as mentioned above. Additionally, a DC voltage signal of +24 V (i.e., a signal representing that the four-way valve 4 is changed) is always outputted from a terminal NO. 1 on the same.

When the change pieces 206 and 207 are changed to the COOL (cooling mode) side, electricity is fed to the working contact piece 201 via the change contact piece 207. If the detected temperature is higher than a preset one, this means that the working contact piece 201 is changed to the C side. Thus, a signal generated by a DC voltage of +24 V is outputted to the terminal NO. 3 on the connector 123.

Reference numeral 208 designates a fan control switch. When this switch 208 is changed to the ON side (automatic side), a signal generated by a DC voltage of +24 V (i.e., a signal representing that the electric motor 13 is driven) is outputted from a terminal NO. 2 on the connector 123 in synchronization with the DC voltage signal outputted from the terminal NO. 3 on the same. In other words, a signal for bringing an operation of the cross flow fan 8 in association with ON/OFF of the compressor 13 is outputted from the terminal NO. 2 on the connector 123. When the fan control switch 208 is changed to the OFF side (continuous operation side), a signal generated by a DC voltage is continuously outputted from the terminal NO. 2 on the connector 123 regardless of ON/OFF of the compressor 2.

Referring to FIG. 4 again, when a DC voltage of 24 V is outputted from a terminal NO. 1 on the connector 120 (i.e., during a heating operation), this voltage of 24 V is divided by resistors 128 and 129, and an output derived from the thus divided voltage is fed to the buffer 108 via a Zener diode 130, causing the auxiliary relay 107 for changing the four-way valve 4 to be turned on.

At this time, the Zener diode 130 serves to prevent the voltage lower than a Zener voltage from passing therethrough. In addition, the leak voltage induced attributable to the generation of noise and the arrangement of electric heaters 203, 204 and 205 is not permitted to pass through the Zener diode 130.

When a voltage of 24 V is outputted from a terminal NO. 2 on the connector 120 (in response to a signal instructing that the fan is rotated), the voltage of 24 V is divided by resistors 131 and 132, and subsequently, an output from the resistors 131 and 132 is fed to the buffer 110, causing the auxiliary relay 103 for rotating the blowers 6 and 12 to be turned on.

When a voltage of 24 V is outputted from a terminal NO. 3 on the connector 120 (in response to a signal instructing that the compressor 2 is operated), the voltage of 24 V is divided by resistors 133 and 134, and subsequently, an output from the resistors 133 and 134 is fed to the comparator 54 shown in FIG. 3 via a Zener diode 135, switching transistors 136 and 137 and a resistor 138, causing the auxiliary relay 106 for operating the compressor 2 to be turned on.

At this time, the Zener diode 135 prevents the voltage lower than a Zener voltage from passing therethrough. In addition, the leak voltage induced attributable to the generation of noise and the arrangement of the electric heaters 203, 204 and 205 is not permitted to pass through the Zener diode 135.

At the same time, a switching transistor 140 is turned off with the aid of a diode 139 while preventing electricity from being fed to the electric heater 9.

When a voltage of 24 V is outputted from a terminal NO. 4 on the connector 120 (in response to a signal instructing that the compressor 2 is operated), the voltage of 24 V is divided by resistors 141 and 142, and subsequently, the output derived from the thus divided voltage is fed to the buffer 113 via a Zener diode 143, switching transistors 144 and 140 and a resistor 145 in the form of a voltage having a H level, causing the auxiliary relays 103 and 104 for activating the electric heater 9 to be turned on.

At this time, the transistor 144 is turned on, and a potential appearing between a diode 52 and a resistor 43 shown in FIG. 2 is lowered to assume a H level, whereby an operation of the compressor 2 can forcibly be stopped in the same manner as mentioned above. The Zener diode 143 serves to prevent the voltage lower than the Zener voltage of the Zener diode 143 from passing therethrough, and moreover, the generation of noise as well as the generation of leak electricity attributable to the arrangement of the electric heaters 203 to 205 are shut out also in the same manner as mentioned above.

In FIG. 4, reference numeral 147 designates a temperature switch which is used for preventing the room to be air-conditioned from being frozen. The temperature switch 147 is electrically connected to a connector 146. Contact pieces of the temperature switch 147 are closed when the temperature of the room to be air-conditioned is lowered to reach a level of about 3° C. When the contact pieces of the temperature switch 147 are closed, a voltage having a H level is applied to the buffer 113, causing electricity to be fed to the electric heater 9. Thus, a heating operation is started so as to prevent a malfunction of excessive cooling of the room to be air-conditioned such as firm closing of doors in the room due to a phenomenon of freezing or the like from arising due to the foregoing phenomenon of freezing.

A connector 125 is electrically connected to a connector 126, thereby a jumper line 149 is also connected in the electric circuit. Once the connector 125 and the connector 126 are electrically connected to each other, it is possible to perform only an air blowing operation while the switch 127 in the central controller is kept open. Incidentally, since electricity is fed via a diode 151 while the switch 127 is kept opened, this makes it possible to rotationally drive the fan even when the connector 125 is disconnected from the connector 126.

Provided that the connector 126 is electrically connected to the connector 125 and it is preset that a cooling operation and a heating operation are performed with the aid of the control circuit shown in FIG. 2 or the control circuit show in FIG. 5 while the switch 127 is kept open, electricity can be fed to each of the auxiliary relays 101 and 102 so as to substantially perform only an air blowing operation. It should be noted that a normal air conditioning operation can be performed, if the switch 127 is kept closed.

In the case that it is preset that a cooling operation and a heating operation can be performed with the aid of the controlling circuit shown in FIG. 2 or the controlling circuit shown in FIG. 5, electricity can not be fed to the auxiliary relays 101 and 102 when the connector 126 is disconnected from the connector 125 and the switch 127 is kept open, resulting in any air-conditioning operation failing to be achieved any longer.

Referring to FIG. 4 again, VDD is electrically connected to a DC supply source to receive DC electricity from the latter.

With the controlling apparatus of the present invention constructed in the above-described manner, there does not arise a malfunction that each controlling circuit is erroneously operated when a small quantity of electric current leaks from the electric heater 9 operable for the purpose of temperature compensation.

In addition, since the controlling apparatus includes an electric circuit which makes it possible to effectively rotationally drive the electric motor 13 at all times without a necessity for asking for any aid given by the switch for the central controlling unit, an operator can confirm that the air conditioner is properly operated irrespective of actuation of each of the switches.

While the present invention has been described above with respect to a single preferred embodiment thereof, it should of course be understood that the present invention should not be limited only to this embodiment but various change or modification may be made without any departure from the scope of the present invention as defined by the appended claims.

What is claimed is:

1. A controlling apparatus for an air conditioner including a compressor, a heat exchanger on a heat source side, an expansion device, and a heat exchanger on a utilization side, comprising:

a relay to be energized to supply electric current from a source to said compressor, a semiconductor element including a controlling terminal to control the energization of said relay in response to a signal applied to said controlling terminal, a thermostat for changing the connected state of a contact piece between two terminals depending on a desired temperature and a detected temperature, a heating section connected to said two terminals of said thermostat in order to have voltage of a first value applied thereto to generate heat, said heating section providing a differential each time the connected state of said contact piece is changed between said two thermostat terminals, at least one transmitting path for supplying voltage from said contact piece of said thermostat to said controlling terminal of said semiconductor element as a signal to energize said relay to a state to supply current to said compressor, and an electric circuit in said at least one transmitting path for preventing said voltage of a first value from being supplied to said controlling terminal of said semiconductor element through said at least one transmitting path via said contact piece, whereby said semiconductor element is prevented from energizing said relay in response to the supply of the voltage of said first value and operation of said compressor.

2. A controlling apparatus for an air conditioner according to claim 1, wherein said electric circuit further comprises a Zener diode disposed in said at least one transmitting path, a Zener voltage of said Zener diode being higher than a voltage corresponding to said voltage of a first value, an anode of said Zener diode being connected to said controlling terminal via said at least one transmitting path to prevent said voltage of a first value from being fed to said controlling terminal of said semiconductor element to restrict operation of said compressor.

3. A controlling apparatus for an air conditioner including a compressor, a four-way valve, a heat exchanger on a heat source side, an expansion device, and a heat exchanger on a utilization side, said air conditioner performing a cooling operation and a heating operation upon changing operative states, of said four-way valve, and an electric heater, comprising;

a first relay to supply electric current from a source to said compressor upon being energized, a second relay to supply electric current to said electric heater upon being energized, a semiconductor element for controlling said compressor, said semiconductor element controlling the energization of said first relay in response to a signal applied to a controlling terminal thereof, a semiconductor element for controlling said electric heater, said semiconductor element controlling the energization of said second relay in response to a signal applied to a controlling terminal thereof, a thermostat for controlling said compressor, said thermostat serving to change the connected state of a contact piece between two terminals depending on a first desired temperature and a detected temperature, a heating section connected to said two terminals of said thermostat in order to have voltage applied thereto to generate heat, said heating section providing a differential each time the connected state of said contact piece of said thermostat is changed between said two thermostat terminals, a respective transmitting path to supply the voltage from said contact points of said thermostat to the controlling terminal of each of said semiconductor elements as a respective signal to be applied to the controlling element of each of said semiconductor elements, and a restricting circuit in each said transmitting path, each of said restricting circuits restricting the feeding of said voltage of said first value to each of said semiconductor elements, whereby each of said semiconductor elements is prevented from energizing its respectively connected relay in response to the supply of said voltage of said first value during a time when an operation of said compressor and/or supply of current to said electric heater should be stopped.

4. A controlling apparatus for an air conditioner according to claim 3, wherein each of said restricting circuits further comprises at least one Zener diode disposed in one of said transmitting paths, a Zener voltage of said Zener diode being higher than a voltage corresponding to said voltage of first value, an anode of said Zener diode being connected to said controlling terminal via said transmitting path to prevent said voltage of first value from being fed to said controlling terminal of said semiconductor element to restrict an operation of said compressor and/or feeding of current to said electric heater.

5. A controlling apparatus for an air condition according to claim 4, further comprising a Zener diode for restricting an operation of said compressor and/or supply of current to said electric heater and/or an operation for changing said four-way valve.

6. A controlling apparatus for an air conditioner including a compressor, a heat exchanger on a heat source side, an expansion device, and a heat exchanger on a utilization side, said air conditioner further including an electric motor for blowing air-conditioned air in said heat exchanger on the utilization side to a regulating chamber, comprising;

a first relay for controlling upon energization the supply of electrical current to said compressor, said first relay being connected to a current source by a semi-conductor switch, a second relay for controlling upon energization the supply of electrical current to said electric motor, said second relay being connected to the output of said semi-conductor switch by a diode, a temperature controlling circuit for controlling an operation of each of said first and second relays depending on a detected temperature value and a preset temperature value, a switch for forcibly stopping at least the supply of current to said compressor and said electric motor irrespective of an operation of said temperature controlling circuit, the output of said switch being connected to a controlling terminal of said semi-conductor switch, and an electric circuit movably arranged between said current source and said second relay for making it possible to supply current to said electric motor irrespective of the actuation of said switch to control said temperature controlling circuit relative to said electric motor.

* * * * *